(12) United States Patent
Reilly

(10) Patent No.: US 11,526,794 B2
(45) Date of Patent: Dec. 13, 2022

(54) QUANTUM BIOS FOR RECONFIGURING QUANTUM COMPUTING ARCHITECTURES

(71) Applicant: Turing Inc., Los Angeles, CA (US)

(72) Inventor: Michele Reilly, Los Angeles, CA (US)

(73) Assignee: Second Foundation, Cambridge, MA (US)

( * ) Notice: Subject to any disclaimer, the term of this patent is extended or adjusted under 35 U.S.C. 154(b) by 826 days.

(21) Appl. No.: 16/388,283

(22) Filed: Apr. 18, 2019

(65) Prior Publication Data

US 2019/0325336 A1 Oct. 24, 2019

Related U.S. Application Data

(60) Provisional application No. 62/659,670, filed on Apr. 18, 2018, provisional application No. 62/659,666, filed on Apr. 18, 2018.

(51) Int. Cl.
*G06N 10/00* (2022.01)
*G06F 11/10* (2006.01)
*G06N 20/00* (2019.01)

(52) U.S. Cl.
CPC ......... *G06N 10/00* (2019.01); *G06F 11/1044* (2013.01)

(58) Field of Classification Search
None
See application file for complete search history.

(56) References Cited

U.S. PATENT DOCUMENTS

| | | | |
|---|---|---|---|
| 2003/0005010 A1* | 1/2003 | Cleve | B82Y 10/00 708/403 |
| 2004/0000666 A1* | 1/2004 | Lidar | G06N 10/00 257/31 |
| 2005/0167658 A1* | 8/2005 | Williams | B82Y 10/00 257/31 |
| 2012/0112168 A1* | 5/2012 | Bonderson | G06N 10/00 257/31 |
| 2012/0254586 A1* | 10/2012 | Amin | G06N 10/00 712/E9.002 |
| 2016/0352515 A1* | 12/2016 | Bunandar | H04L 9/0852 |

OTHER PUBLICATIONS

Morimae, Basics and applications of measurement-based quantum computing, IEEE, Conference Paper, pp. 327-330. (Year: 2014).*

* cited by examiner

*Primary Examiner* — April Y Blair
*Assistant Examiner* — Dipakkumar B Gandhi
(74) *Attorney, Agent, or Firm* — The Webb Law Firm

(57) ABSTRACT

Described herein are methods and systems for controlling an integrated optics control system for quantum computing using a quantum bios chip. A quantum bios chip, comprising one or more qubit connection geometries and one or more error correction codes associated with the qubit connection geometries, receives instructions associated with a quantum computing application. The quantum bios chip configures one or more switching elements of an integrated optics control system coupled to the quantum bios chip, the switching elements controlling entanglement of one or more qubits of a quantum computer and the switching elements configured based upon a selected one of the one or more qubit connection geometries and one of the one or more error correction codes that is compatible with the selected one of the one or more qubit connection geometries.

17 Claims, 7 Drawing Sheets

//QUANTUM BIOS FOR RECONFIGURING
QUANTUM COMPUTING ARCHITECTURES

RELATED APPLICATIONS

This application claims priority to U.S. Provisional Patent Application No. 62/659,666, filed on Apr. 18, 2018, and U.S. Provisional Patent Application No. 62/659,670, filed on Apr. 18, 2018, the entirety of each of which are incorporated herein by reference.

TECHNICAL FIELD

This application relates generally to a quantum bios for reconfiguring quantum computing architectures.

BACKGROUND

The concept of an inbuilt quantum bios refers to the ability for a quantum computing architecture to reconfigure itself to optimize performance for a given computational or communications task. Large-scale, practical applications of quantum computing technology is generally a question of how quantum error-correction is implemented. Due to the intrinsic fragility of quantum states, it is recognized that at least for the foreseeable future, active error correction protocols will be necessary for any practical or commercial application as naturally long lived qubits are currently technologically infeasible. Research into the area of Noisy Intermediate-Scale Quantum (NISQ) applications is in its infancy and may result of impactful applications with non-error corrected hardware, but so far this research has not yielded any significant results.

Error correction protocols dominate many of the applications for quantum computation and communications. A rough metric is that on the order of 95% of the computational time is relegated to performing error correction and constructing logic operations that are compatible with a fully fault-tolerant, error-corrected machine. Consequently, strategic choices about the methods used for error-correction and how they relate to the target application can drastically change the physical resource requirements (physical qubits and real world computational time) for that application.

SUMMARY

Therefore, what is needed are systems and methods for configuring a quantum computing architecture, including the optical controls that coordinate entanglement of the qubits of the quantum computing architecture, based upon the particular quantum computing algorithm or application that is to be run. The methods and systems described herein advantageously incorporate a quantum bios chip that analyzes instructions associated with a quantum computing application and configures an integrated optics control system coupled to the quantum computer to enable execution of the quantum computing application while ensuring availability of sufficient physical resources in the quantum computer, and utilizing proper error correction parameters.

The invention, in one aspect, features a system for controlling an integrated optics control system for quantum computing using a quantum bios chip. The system comprises a quantum bios chip comprising one or more qubit connection geometries and one or more error correction codes associated with the qubit connection geometries. The system comprises an integrated optics control system coupled to the quantum bios chip, the integrated optics control system comprising a plurality of switching elements that control entangle of one or more qubits of a quantum computer. The quantum bios chip receives instructions associated with a quantum computing application and configures one or more of the switching elements of the integrated optics control system based upon a selected one of the one or more qubit connection geometries and one of the one or more error correction codes that is compatible with the selected one of the one or more qubit connection geometries.

The invention, in another aspect, features a method of controlling an integrated optics control system for quantum computing using a quantum bios chip. A quantum bios chip, comprising one or more qubit connection geometries and one or more error correction codes associated with the qubit connection geometries, receives instructions associated with a quantum computing application. The quantum bios chip configures one or more switching elements of an integrated optics control system coupled to the quantum bios chip, the switching elements controlling entanglement of one or more qubits of a quantum computer and the switching elements configured based upon a selected one of the one or more qubit connection geometries and one of the one or more error correction codes that is compatible with the selected one of the one or more qubit connection geometries.

Any of the above aspects can include one or more of the following features. In some embodiments, the quantum bios chip receives the instructions associated with a quantum computing application from a remote computing device. In some embodiments, the quantum computing application is a quantum supremacy algorithm. In some embodiments, upon receiving the instructions associated with the quantum supremacy algorithm, the quantum bios chip determines whether sufficient qubits are available in the quantum computer to execute the quantum supremacy algorithm; calculates a quantum circuit area; determines that the quantum circuit area is smaller than a predetermined threshold; selects a qubit connection geometry from the one or more qubit connection geometries that is compatible with the quantum supremacy algorithm; recompiles the instructions to enforce one or more geometric constraints of the selected qubit connection geometry; and configures the integrated optics control system using the selected qubit connection geometry. In some embodiments, the quantum computer executes the quantum supremacy algorithm after being configured by the integrated optics control system.

In some embodiments, the quantum computing application is a memory storage application. In some embodiments, upon receiving the instructions associated with the memory storage application, the quantum bios chip determines that the memory storage application does not require quantum data processing; determines that sufficient qubits are available in the quantum computer to achieve a target memory time contained in the instructions; selects one of the one or more error correction codes that achieves the target memory time and maximizes a number of memory cells; and configures the integrated optics control system using one of the qubit connection geometries associated with the selected error correction code. In some embodiments, the quantum computer executes the memory storage application after being configured by the integrated optics control system.

In some embodiments, the quantum computing application is a quantum computation algorithm. In some embodiments, upon receiving the instructions associated with the quantum computation algorithm, the quantum bios chip calculates a quantum circuit area and a logical error rate associated with the quantum computation algorithm; selects one of the one or more error correction codes that is associated with an error threshold that is below a physical error rate of the quantum computer; compiles the selected error correction code using the logical error rate; and configures the integrated optics control system using a resource configuration associated with the compiled error correction code. In some embodiments, the quantum computer executes the quantum computation algorithm after being configured by the integrated optics control system.

In some embodiments, the selected qubit connection geometry is a linear nearest neighbor (LNN) connection geometry. In some embodiments, the selected qubit connection geometry is a two-dimensional nearest neighbor (2DNN) connection geometry. In some embodiments, configuring one or more of the switching elements of the integrated optics control system comprises activating at least one of the switching elements based upon the selected qubit connection geometry. In some embodiments, configuring one or more of the switching elements of the integrated optics control system comprises deactivating at least one of the switching elements based upon the selected qubit connection geometry. In some embodiments, at least one of the plurality of switching elements comprises a phase modulator that acts on optical pulses traveling through an etched waveguide underneath the phase modulator.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Changing the specific approach to error-correction in the quantum architecture described herein is purely related to the structure of the integrated optics that is fabricated to couple together the individual NV/defect systems. The fabrication of the individual defects and the cavities themselves are identical, regardless of how the machine is configured and used. An example of the fabrication and operation of an optically-coupled Nitrogen Vacancy (NV) defect system for scalable qubit arrays is described in co-pending U.S. patent application Ser. No. 16/388,312, titled "Optically-Coupled Nitrogen Vacancy (NV) Defect System for Scalable Qubit Arrays," filed on Apr. 18, 2019, which claims priority to U.S. Provisional Patent Application No. 62/659,670, filed on Apr. 18, 2018, which are incorporated herein by reference. As described there, integrated optics can be fabricated to embed multiple configuration modes, to allow the NV/cavity systems to be arranged in several different geometric arrangements. This relegates the mode of operation for the machine to how the integrated optics system is controlled, rather than any intrinsic fabrication constraints of the system. Consequently, the machine can be programmed.

Figure 1:
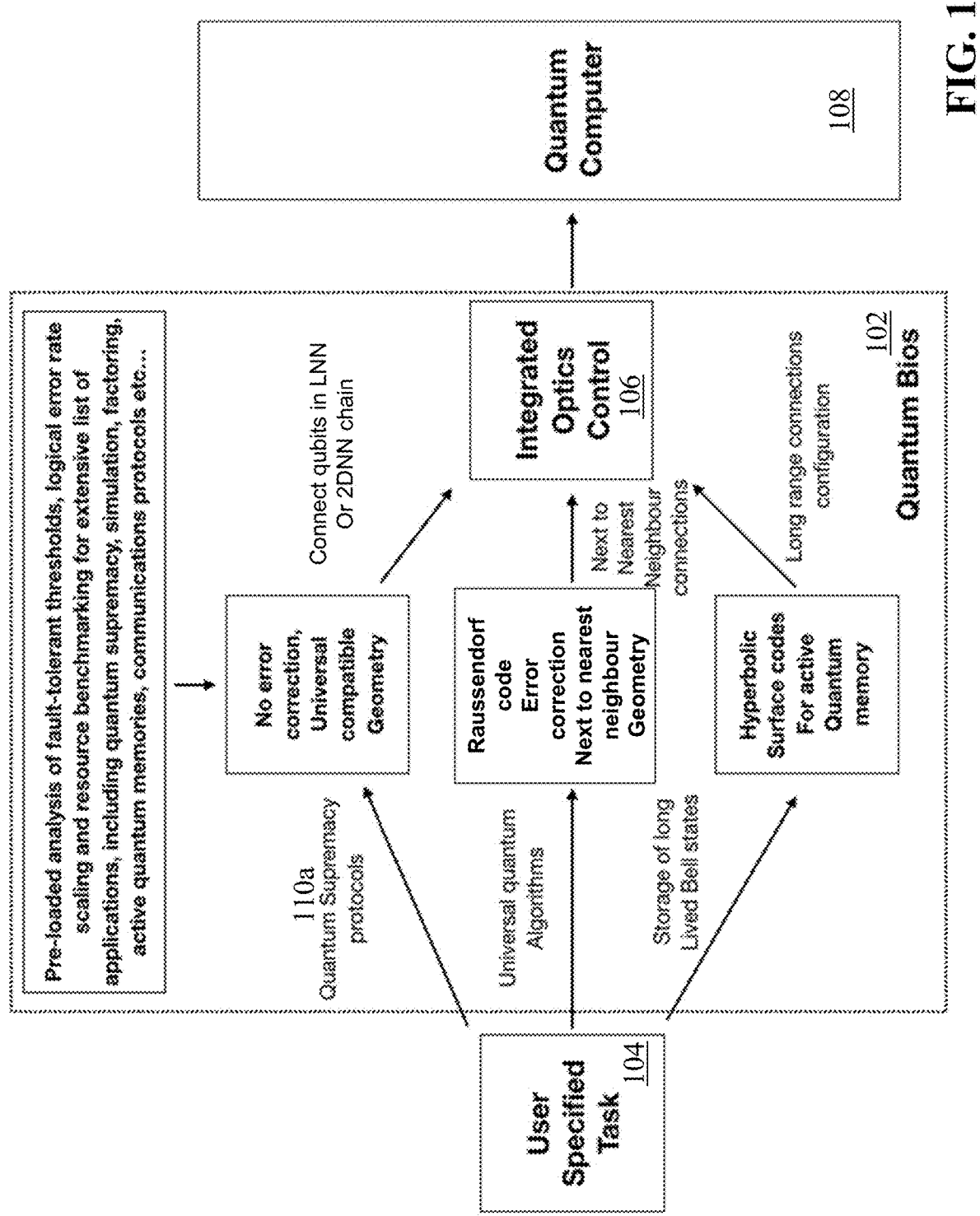
FIG. 1 is a block diagram of the structure of how the quantum bios is integrated to the quantum computer.

Generally, the quantum bios system is a classical module that can be added to the system to interrogate the application specified by the user and automatically reconfigure the operation of the integrated optics system to optimize performance. The basic structure of how the quantum bios is integrated to the quantum computer is illustrated in FIG. 1. As shown in FIG. 1, the quantum bios 102 receives user-specified task(s) 104 (e.g., in the form of computerized instructions such as Quantum Supremacy protocols, universal quantum algorithms, storage of long-lived Bell states, etc.) and configures the integrated optics control system 106 according to the desired user-specified task(s). The reconfigured optics control system is then used by the quantum computer 108 to generate output.

The quantum bios is a classical control chip that has the ability to reconfigure the controls for the integrated optics layer in the quantum computer. This changes the connection geometry of the NV/cavity chip. The integrated optics layer (as illustrated previously with LNN and 2DNN connection geometries in co-pending U.S. patent application Ser. No. 16/388,312, filed on Apr. 18, 2019, which claims priority to U.S. Provisional Patent Application No. 62/659,670, filed on Apr. 18, 2018) is designed to allow for multiple connection geometries amongst the NV/cavity systems and these can be set from the quantum bios chip. The chip itself is configured with the set of connection geometries that are available from the integrated optics and the chip is also loaded with the specific details of all error correction codes that are compatible with the allowed connection geometries. These specific details include, but are not limited to:

- Numerical estimates of the fault-tolerant threshold;
- Exact scaling of qubit number vs. logical error rate for each code;
- Decoding procedures and algorithms for each supported code;
- Fault-tolerant logical gate procedures for universal computation, Entangled state preparation and other quantum information related protocols;
- Resource benchmarking software that can calculate the exact number of physical qubits and wall time necessary for a large selection of quantum information processing tasks.

By including the following elements into the quantum bios, a user can interface to the quantum computer purely via the high-level application(s) or user-specified task(s) they wish to run. Therefore, the specific configuration of the quantum computer is an internal procedure that the user does not need to interface with. In this document, three exemplary use cases are described as notable examples of how the quantum bios is used.

Non-Corrected Error Testing

Arguably the only small scale quantum algorithm that could be successfully run without error correction is the quantum sampling or quantum supremacy algorithm. Analysis shows that a circuit containing approximately 50 qubits and 40 computational time-steps is sufficient to demonstrate a non-commercial protocol that can outperform the most powerful supercomputers on the planet (now and in the future). The quantum supremacy algorithm requires error rates to be at or below, $p<1/(50\times40)=0.05\%$, which is in the range for current quantum hardware development and is considered an appropriate "operational error rate" for a large-scale quantum computer.

Figure 2:
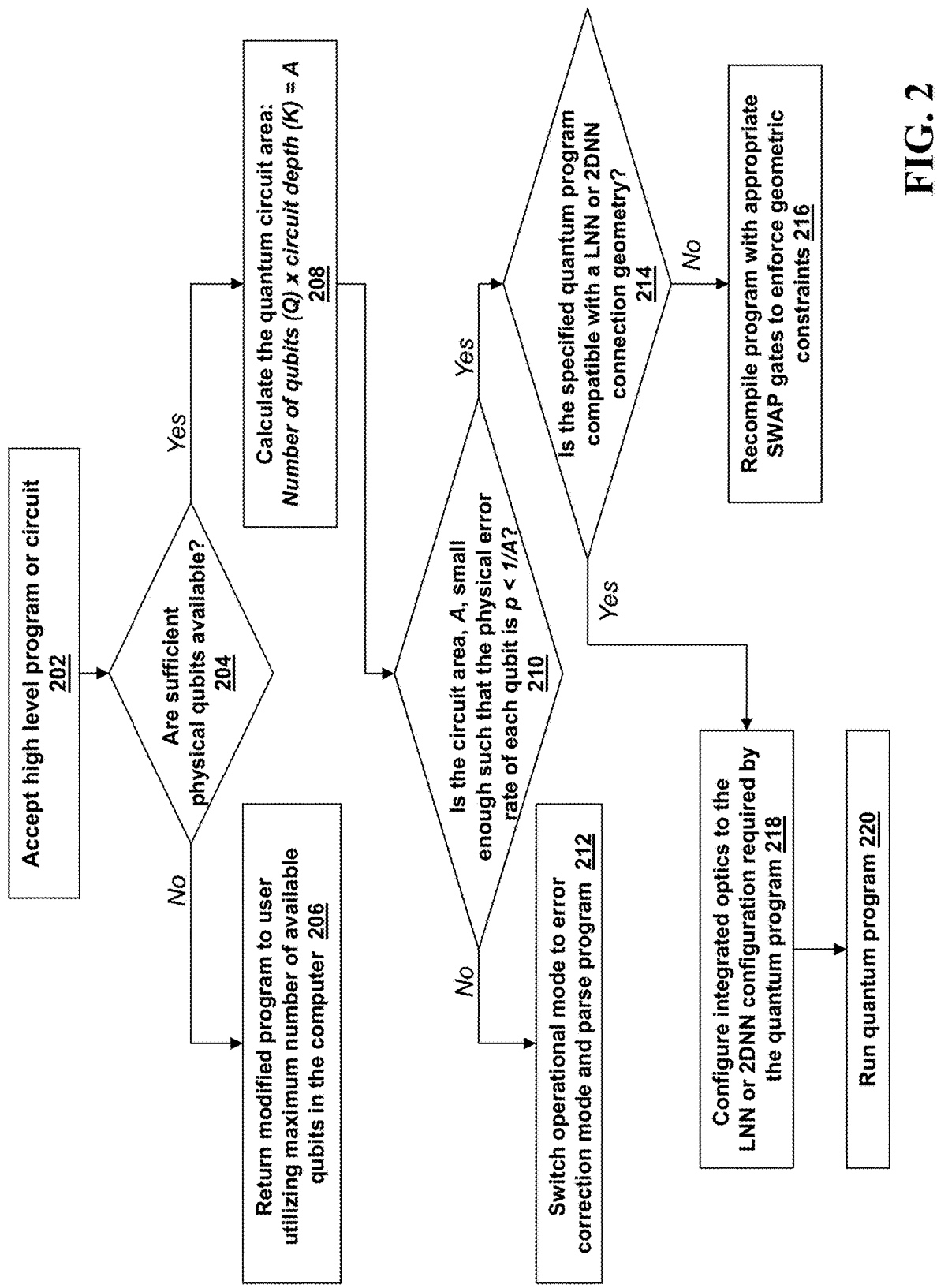
FIG. 2 is a flow diagram of a method of configuring the quantum bios for a quantum supremacy algorithm.

If the user specifies this particular application/task (shown as 110a in FIG. 1), the quantum bios analyzes and performs the following operations, described in conjunction with the flow diagram of FIG. 2. The quantum bios accepts (202) the high level program or circuit, and determines (204) whether sufficient physical qubits are available. If not, the bios returns (206) a modified program to the user that utilizes a maximum number of available qubits in the computer. If there are sufficient physical qubits available, the bios calculates (208) the quantum circuit area using the equation: number of qubits (Q)×circuit depth (K)=A. The bios determines (210) whether the circuit area A is small enough such that the physical error rate of each qubit is $p<1/A$. If not, the bios switches (212) operational mode to error correction mode and parses the program. If the circuit area is small enough, then the bios determines (214) whether the specified quantum program is compatible with an LNN or 2DNN connection geometry. If not, the bios recompiles (216) the program with appropriate SWAP gates to enforce geometric constraints. If the quantum program is compatible, then the bios configures (218) the integrated optics system(s) to the LNN or 2DNN configuration required by the quantum program and runs (220) the quantum program on the appropriately configured hardware.

The example shown above is specific to a non-error corrected algorithm (such as quantum supremacy), where the physical error rates of the system are sufficient and no error-correction encoding is necessary.

If the quantum circuit or algorithm is too large, and physical error rates too high, the quantum bios parses the program to the next part of the bios, that now examines the exact nature of the error correction that is needed. One particular application would be a long-lived, active, quantum memory that may be utilized for quantum communications protocols.

Error Corrected Qubits for Quantum Communications

Another mode of operation for the qubit array is encoding error-corrected qubits simply to store their information state for a long period of time. This is a subset of a universal, error-corrected quantum computer, as it is not needed to be able to apply a universal, encoded gate set on the data. It may only be required to prepare a small subset of encoded states and apply one or two logic operations. This is exemplified by quantum communications protocols. In these protocols, a two-qubit Bell state is prepared. One of the qubits in the Bell state is physically transported from a source location to a destination location. This transport is usually carried out by single photons, but it does not need to be. Another approach is where qubits such as the NV-defects described herein are encoded into a two-qubit Bell state and then one of the two qubits is physically moved to another location. This long distance Bell state can then be used to teleport information between the two physical locations of the Bell state. Consequently, the preparation of the two-qubit Bell state and its physical transportation sets up a virtual quantum communications channel that can utilized later to communicate between two parties in a quantum manner.

The number one problem with the distribution of these quantum Bell states is that they are fragile and would not survive the physical transport itself. In the case where physical transport is single photons, the photon will be lost through standard optic fiber with essentially unit probability once the communications distance reaches the attenuation length of standard fibre optics (about 25 km). If the physical transport is that actual movement of a solid state qubit (like the NV-defect), then quantum noise overwhelms the system very quickly and effectively erases (decoheres) the qubit. Hence, extensive error correction is required to communicate Bell states over the distances associated with human activity.

Error correction for quantum communications does not require a universal error corrected model. A universal set of quantum gates to realize any physically valid operation is not required as only Bell states are being created, held for an appropriately long time so that one half of the Bell state can be physically moved to the destination location, and finally measured. If only a subset of operations is needed for distributing Bell states (quantum entanglement), there is practical reasons to choose other error-correcting codes and hence hardware configurations. The quantum bios would again analyze the requirements from the user and follow a series of steps illustrated in FIG. 3.

Figure 3:
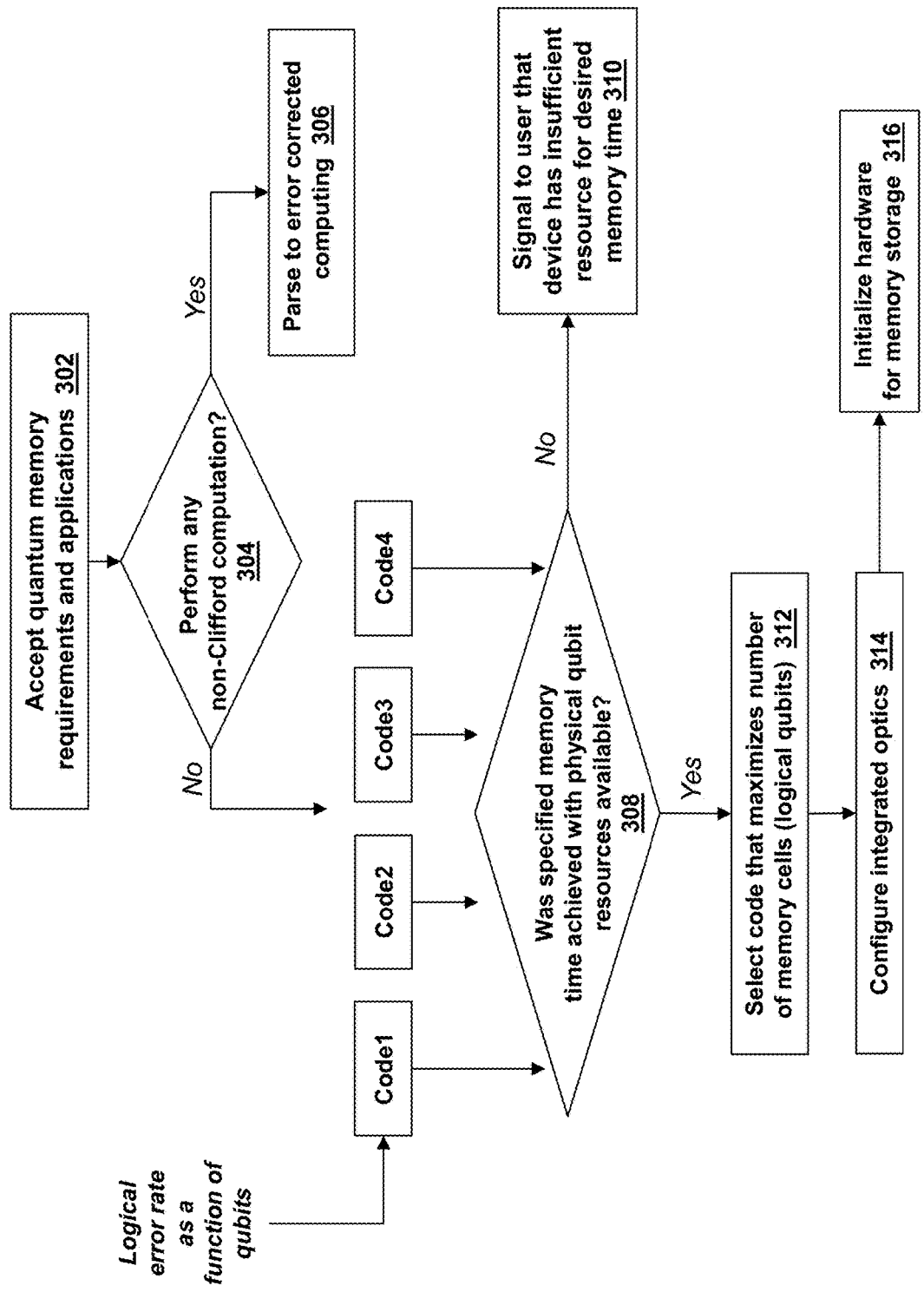
FIG. 3 is a flow diagram of a method of configuring the quantum bios for a long-term memory storage application.

As shown in FIG. 3, the user can specify quantum memory requirements and applications (e.g., the desired memory time needed from the encoded qubits and the number of memory cells needed for the application (in this case, entanglement distribution)). The bios accepts (302) the quantum memory requirements and applications, and performs (304) a quick check on the application specification to determine that only computationally trivial tasks are required (i.e., non-Clifford operation check). If actual data processing is needed, the bios parses (306) the application specification to the part of the bios that is used for universal quantum computation. If the application specification passes this initial check (i.e., does not require actual data processing), the bios analyzes multiple error correction codes (Code1, Code2, Code3, Code4) to calculate the number of physical qubits needed, per memory cell (logical qubit), to achieve the target memory time and target logical fidelity.

The logical fidelity is again calculated from the specified application. For example:

If memory cells (logical qubits) are being used to exchange keys in a quantum key distribution protocol, logical fidelities of 90-95% are tolerable if this increases the number of memory cells (logical qubits) that can be encoded.

If memory cells (logical qubits) are to be used to create and entanglement channel that will be utilized to teleport information between two error corrected quantum computers, fidelities that match the encoded fidelities of the computers are needed. This can be infinitesimally close to 100%, and hence the logical fidelity after some amount of storage time needs to be higher and consequently the number of memory cells (logical qubits) will be fewer.

The bios determines (308) whether the specified memory time can be achieved with the physical qubit resources available. If none of the bios-loaded error correction configurations can achieve the requested memory time, for the given number of physical qubits in the device, the bios signals (310) to the user that the device has insufficient resources for the desired memory time. Otherwise, at least one, perhaps more, of the error correction configurations will be able to reach the desired memory time. Each configuration may encode a slightly different number of memory cells (logical qubits) and the bios selects (312) the code that maximizes the number of memory cells and that achieves the desired memory time. The bios then signals the integrated optics to configure (314) the appropriate connection geometry based upon the error correction code, and the quantum hardware is initialized (316) for memory storage.

Universal, General Purpose Quantum Computation

General purpose quantum computation again requires an error correction framework, and again needs to minimize the total amount of qubit resources for a fixed algorithmic specification. Unlike a quantum memory, the error correction utilized must support a universal set of encoded quantum gates. The basic workflow of the quantum computation area of the bios is illustrated in FIG. 4.

Figure 4:
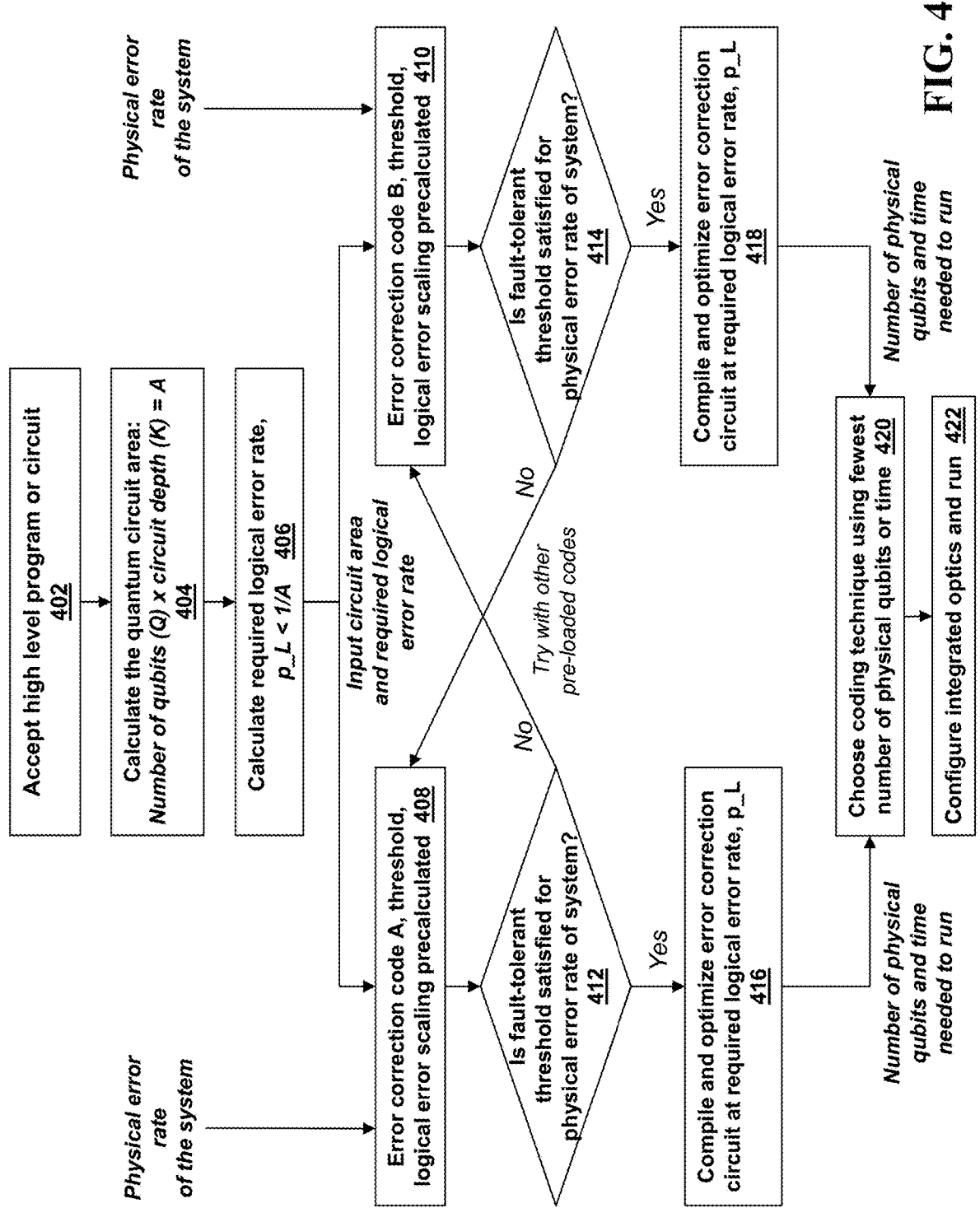
FIG. 4 is a flow diagram of a method of configuring the quantum bios for a general purpose quantum computation application.

It should be appreciated that the method of FIG. 4 assumes two universal error correction techniques (e.g., code A, code B) have been loaded into the bios. In general, more than two code choices are loaded. The bios accepts (402) a high level quantum algorithm or circuit specification along with the physical error rates of the quantum computer, obtained from hardware calibration data within the computer. The bios calculates (404) the quantum circuit area and calculates (406) the required logical error rate. The fault-tolerant threshold for the code and its logical error rate scaling (how well the code performs as we increase the number of qubits in the codeblock) has been pre-calculated and loaded (408, 410) into the bios. The bios determines (412, 414) whether the physical error rate of the computer lies below the fault-tolerant threshold of the respective error correction code(s). If yes, the bios proceeds to compile (416, 418) and optimize the error correction code at the required logical error rate (p_L). If no, the bios automatically tries another preloaded code in the quantum bios. For example, if the bios first evaluated error correction code A, then the bios can now evaluate error correction code B, and so on. If all codes fail the threshold test, the bios can simply not run the algorithm.

As noted above, after a code passes the threshold test the bios compiles (416, 418) and optimizes the error-corrected implementation for the given code. This compiled form can be benchmarked for the number of physical qubits required and the total time to execute the algorithm. Each compiled and benchmarked implementation is then compared, with the bios choosing (420) the most resource optimal configuration (where resource optimal can be defined with respect to the total number of physical qubits, the total amount of computational time or a balance between the two that can be specified by the user or the manufacturer). Once the configuration is chosen, the bios configures (422) the integrated optics to implement a specific coding choice and the algorithm is executed.

It should be appreciated that the internal analysis and configuration of the quantum computer happens automatically without user interaction. At most, the user can specify certain metrics of importance (i.e. should optimization happen with preference to physical qubits or to algorithmic run time) that the bios preferentially adapts the optimization for. Once this offline compilation and optimization takes place (offline is a term for any classical pre-computation that takes place before the quantum computer is initialized), the algorithm is executed and results returned to the user.

The structure of the quantum bios is designed such that the user has as little interaction with the internal configuration of the machine as possible. The user has a certain algorithm, test task or application that they wish to run on the machine and it is the internal bios's responsibility to analyze the application being run and internally decide upon the best configuration to maximize the physical resources available. Consequently the bios determines from the nature of the application whether to use error-correction for quantum memories, universal quantum computation or no error correction at all. This is a seamless experience for the user, and they are only be notified if sufficient quantum resources are not available for the task requested.

Optics Configuration

The configuration of the integrated optics to allow for a pre-loaded configuration is illustrated below through an example of two optical configurations that allow for two connection geometries (with their associated applications) for the underlying qubit array. The two configurations are a Linear Nearest Neighbor (LNN) connection geometry, where each NV-defect is optically connected to its neighbors to the immediate left and right. The second configuration is a 2-dimensional Nearest Neighbor (2DNN), where NV-defects can be connected to immediate neighbors to the left, right, up and down on the chip. Additional detail on the optics configurations is provided in co-pending U.S. patent application Ser. No. 16/388,312, which claims priority to U.S. Provisional Patent Application No. 62/659,670, filed on Apr. 18, 2018, which are incorporated herein by reference.

The LNN configuration is appropriate for a quantum computing system that allows for universal gate operations without implementing error correction protocols. This could be used for small scale algorithmic demonstrations, such as quantum supremacy protocols or to test and or benchmark the performance of the computer.

The 2DNN configuration is needed to implement efficient quantum error correction protocols, such as the surface code to allow for fault-tolerant, universal computation for larger algorithms. The 2DNN geometry is the simplest geometric layout that can implement resource efficient error-corrected computation.

The integrated optics is designed and fabricated such that multiple configurations are embedded within each other. Because it is not possible to refabricate and reassemble each time the bios reconfigures the hardware, the integrated optics needs to allow for all possible configurations programmed in the bios and enable switching between them by applying static control fields to programmable elements in the integrated optics.

Figure 5:
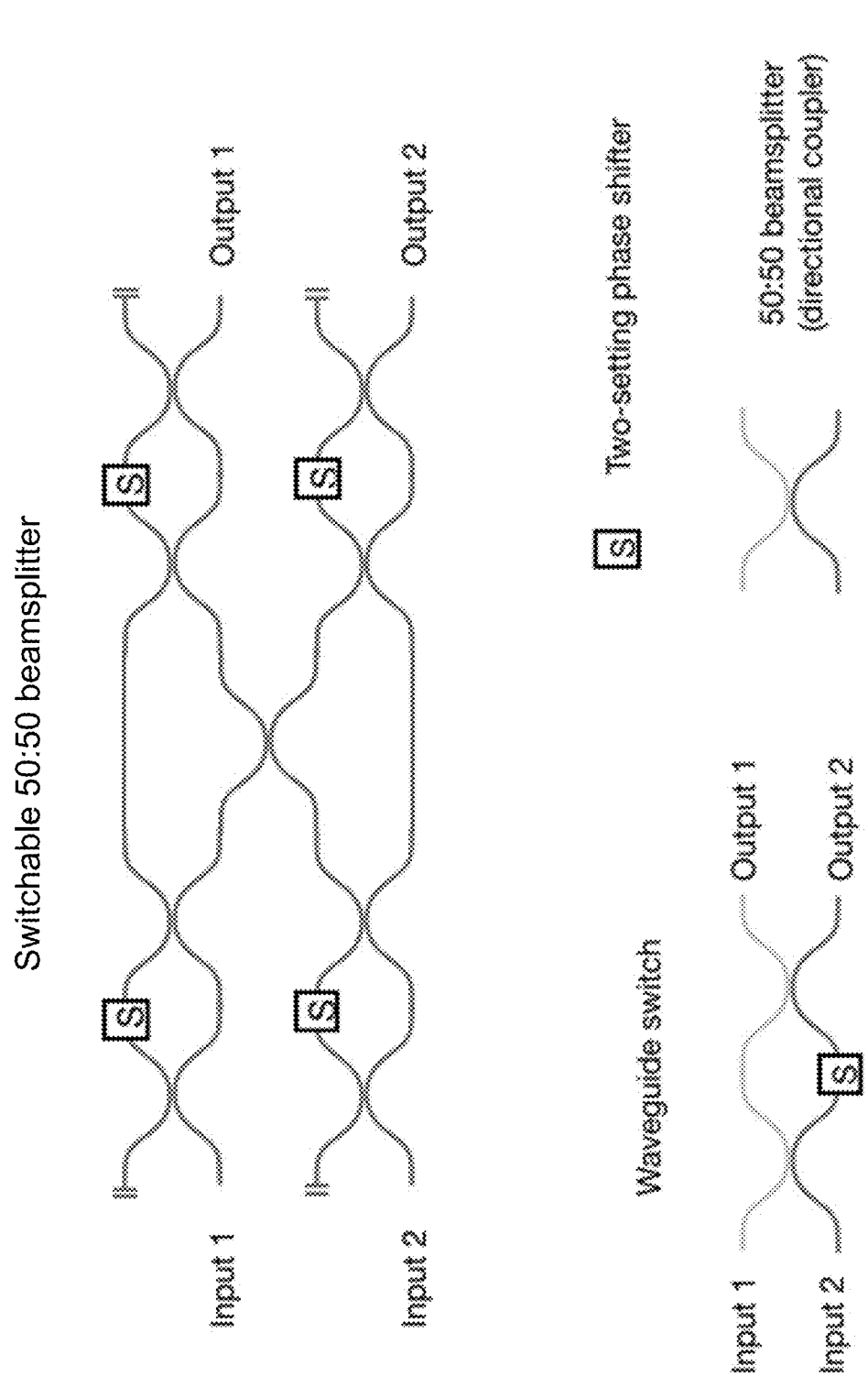
FIG. 5 is a diagram of an integrated optics system configurable by the quantum bios.

FIG. 5 is a diagram of the integrated optics system. A switchable 50:50 beamsplitter consists of 4 switching elements (S boxes in FIG. 5). Physically these elements are phase modulators that act on optical pulses that travel through the etched waveguide that lies underneath. Depending on the choice of optical component used, these may be electro-optic modulators or simple heaters. To briefly explain their operation, the example of heating elements to enable optical switching is used.

The underlying optical waveguide structure is precisely fabricated such that the wave function of a single photon entering from the input side is split of the first directional coupler and then recombined perfectly if it passes through a second at the identical output waveguide. The boxes labeled S in FIG. 5 are simply an electrical resistor that sits on top of the waveguide. If a voltage is applied to that resistor, the resistor heats up and changes the refractive index of the waveguide underneath. This shift in refractive index only occurs to one of the two waveguides (as only one has a heater sitting on top of it) and can impart a relative phase to an optical photon. If the voltage is applied correctly, a perfect pi phase shift is enacted on half the photonic wave function, and when the photon mixes with its counterpart again on the second directional coupler, the photon exits the other output port of the switch (i.e. a photon in input 1 exits output 2 and vice versa). Consequently, the application of a constant voltage over the resistor (labeled by the box S in FIG. 5) causes the photon to switch ports, while a zero voltage causes the photon to exit the same port at which it entered.

The switches are used both to control the entanglement between NV-defects as the computer is operating, but also to configure the static connection geometries controlled by the bios. The difference between the bios control and regular qubit-qubit coupling control is that static voltages are applied to relevant switches when the bios loads a given configuration and these voltages do not change while the computer is running (they only change when the bios reconfigures the integrated optics for a new application). Switches that are utilized for qubit-qubit operations are continuously turned on and off during computational operations to direct photons to the correct NV-defects to produce the required entanglement for operation.

Figure 6:
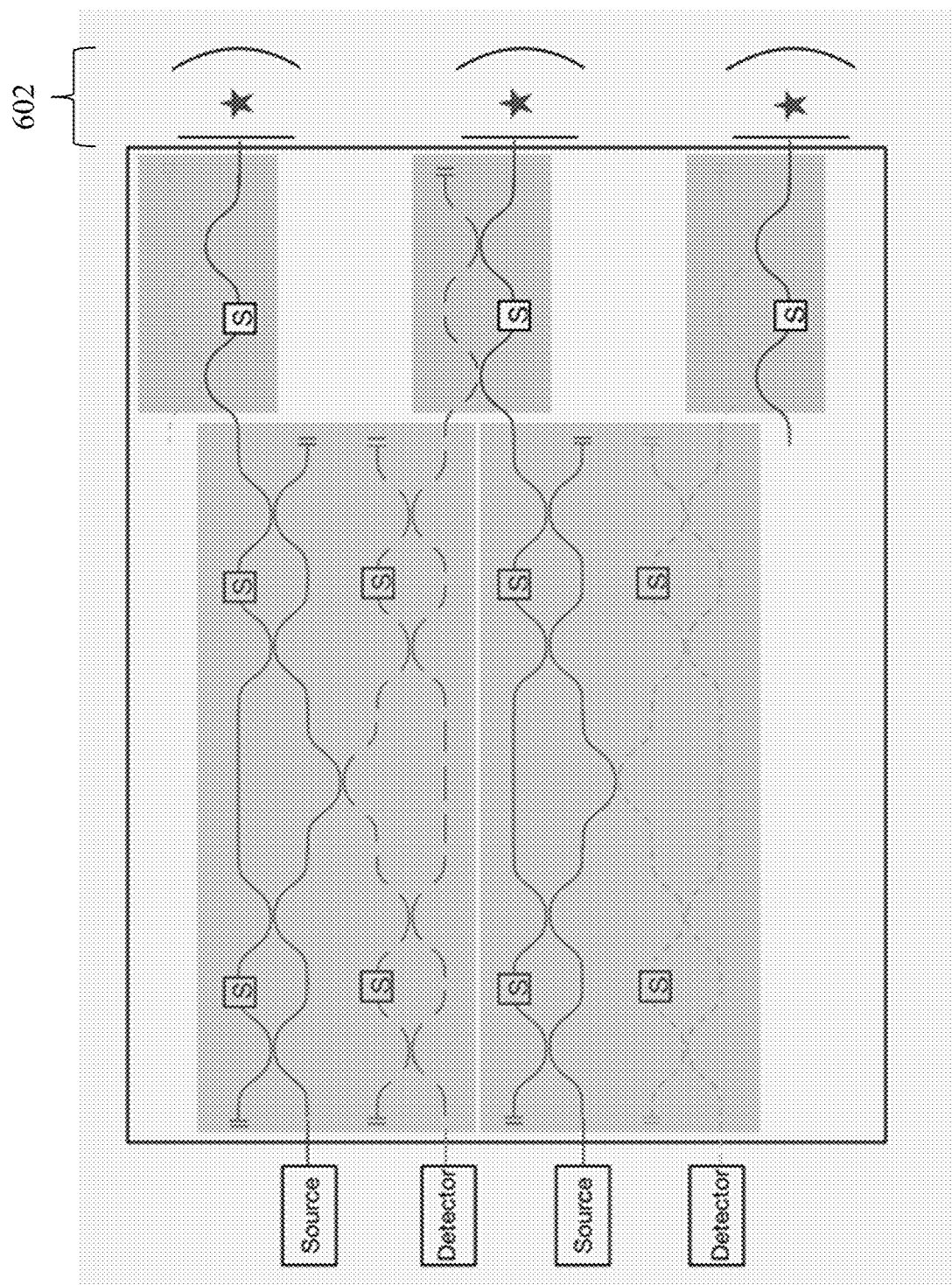
FIG. 6 is a diagram of an integrated optics system for an LNN connection geometry.

As an example, consider the optics for an LNN connection geometry shown in FIG. 6. The switching elements (boxes labeled S in FIG. 6) turn on and off (apply or do not apply voltages to each heating element) as the computer is running to connect the NV-defects (stars 602) to their left and right neighbors as needed during computation. If this connection geometry is combined with further optics for a 2DNN connection geometry, the integrated optics design is duplicated and now there are two sets that are connected but oriented at 90 degrees to each other.

Figure 7:
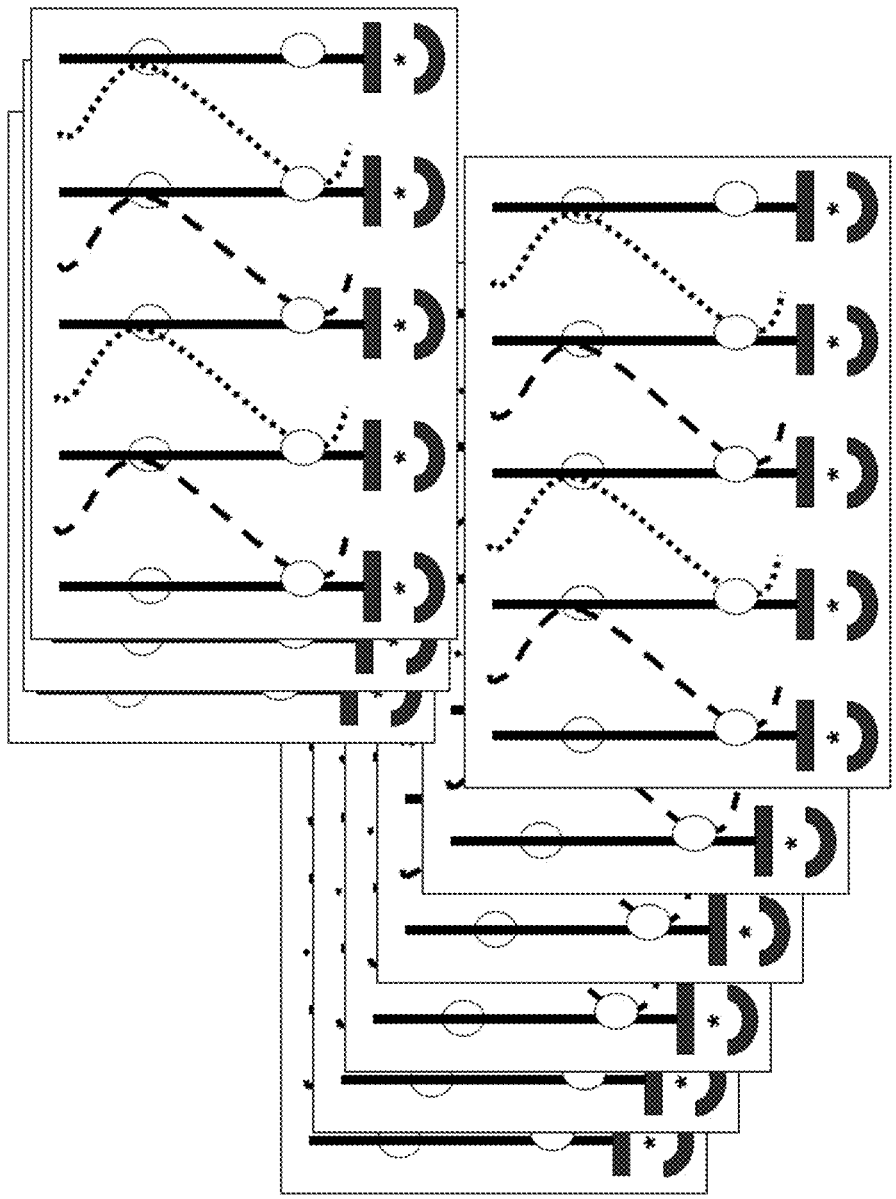
FIG. 7 is a diagram of an integrated optics system for a 2DNN connection geometry.

FIG. 7 is a diagram of a 2DNN connection geometry. As shown in FIG. 7, each solid line, dashed line, and dotted line is an etched waveguide, while the circles are switching elements as detailed above. The lower set of chips is designed to route optical signals down the required pathways to enable the connection of NV/cavity systems to their immediate left/right (east/west) neighbors in the 2D NV-array in the same manner as discussed for the LNN connection structure. The upper-most set of chips perform exactly the same routing and are operated in the same manner as the lower chips when connecting neighboring NV/cavity systems to the north and south. When one set of chips are being used for routing, the "beam-splitter/switches" in the other set are all set to "off" mode. This allows optical signals to simply bypass the layer of chips not being used for active routing for coupling operations. Individual NV-defect measurements are the same as described above and either the upper or lower set of integrated optics chips can be used to route signals from the sources to the detectors (even though the sources and detectors themselves are connected to the upper layer of chips).

This method of allowing for 2DNN connections in the chip enables switching between the 2DNN and LNN connection modes by simply permanently setting all switches/beam-splitters in the upper-set of chips to the "off" mode. When this upper array is permanently in the "off" mode, the system can connect NV/cavity systems in a LNN geometry, suitable for universal computation and when active can be used to allow for 2DNN geometric connections, suitable for fully error-corrected computation.

In some embodiments, the bios is responsible for setting certain optical elements permanently to either the "on" or "off" mode (permanently in this sense is until the bios is asked to reconfigure the optics for a new task) by simply applying static voltages to certain heating elements in the integrated optics. For multiple connection geometries, the integrated optics can be quite complex. The above examples are for the two most trivial cases (LNN and 2DNN). Embedding between 4-6 different connection geometries in the present system architecture is desirable. The optical configuration detailed above is again a pre-loaded set of voltage settings for each switch in the integrated optics. Once a particular configuration is chosen by the bios, configuring the system is not a significant technological challenge Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A system for controlling an integrated optics control system for quantum computing using a quantum bios chip, the system comprising:
    the quantum bios chip comprising one or more qubit connection geometries and one or more error correction codes associated with the qubit connection geometries; and
    the integrated optics control system coupled to the quantum bios chip, the integrated optics control system comprising a plurality of switching elements that control entanglement of one or more qubits of a quantum computer;
    wherein the quantum bios chip receives instructions associated with a quantum computing application and configures one or more of the switching elements of the integrated optics control system based upon a selected one of the one or more qubit connection geometries and one of the one or more error correction codes that is compatible with the selected one of the one or more qubit connection geometries.

2. The system of claim 1, wherein the quantum bios chip receives the instructions associated with a quantum computing application from a remote computing device.

3. The system of claim 1, wherein the quantum computing application is a quantum supremacy algorithm.

4. The system of claim 3, wherein upon receiving the instructions associated with the quantum supremacy algorithm, the quantum bios chip:
    determines whether sufficient qubits are available in the quantum computer to execute the quantum supremacy algorithm;
    calculates a quantum circuit area;
    determines that the quantum circuit area is smaller than a predetermined threshold; selects a qubit connection geometry from the one or more qubit connection geometries that is compatible with the quantum supremacy algorithm;
    recompiles the instructions to enforce one or more geometric constraints of the selected qubit connection geometry; and
    configures the integrated optics control system using the selected qubit connection geometry.

5. The system of claim 4, wherein the quantum computer executes the quantum supremacy algorithm after being configured by the integrated optics control system.

6. The system of claim 1, wherein the quantum computing application is a memory storage application.

7. The system of claim 6, wherein upon receiving the instructions associated with the memory storage application, the quantum bios chip:

determines that the memory storage application does not require quantum data processing;

determines that sufficient qubits are available in the quantum computer to achieve a target memory time contained in the instructions;

selects one of the one or more error correction codes that achieves the target memory time and maximizes a number of memory cells; and configures the integrated optics control system using one of the qubit connection geometries associated with the selected error correction code.

8. The system of claim 7, wherein the quantum computer executes the memory storage application after being configured by the integrated optics control system.

9. The system of claim 1, wherein the quantum computing application is a quantum computation algorithm.

10. The system of claim 9, wherein upon receiving the instructions associated with the quantum computation algorithm, the quantum bios chip:

calculates a quantum circuit area and a logical error rate associated with the quantum computation algorithm;

selects one of the one or more error correction codes that is associated with an error threshold that is below a physical error rate of the quantum computer;

compiles the selected error correction code using the logical error rate; and configures the integrated optics control system using a resource configuration associated with the compiled error correction code.

11. The system of claim 10, wherein the quantum computer executes the quantum computation algorithm after being configured by the integrated optics control system.

12. The system of claim 1, wherein the selected qubit connection geometry is a linear nearest neighbor (LNN) connection geometry.

13. The system of claim 1, wherein the selected qubit connection geometry is a two-dimensional nearest neighbor (2DNN) connection geometry.

14. The system of claim 1, wherein configuring one or more of the switching elements of the integrated optics control system comprises activating at least one of the switching elements based upon the selected qubit connection geometry.

15. The system of claim 1, wherein configuring one or more of the switching elements of the integrated optics control system comprises deactivating at least one of the switching elements based upon the selected qubit connection geometry.

16. The system of claim 1, wherein at least one of the plurality of switching elements comprises a phase modulator that acts on optical pulses traveling through an etched waveguide underneath the phase modulator.

17. A method of controlling an integrated optics control system for quantum computing using a quantum bios chip, the method comprising:

receiving, by the quantum bios chip comprising one or more qubit connection geometries and one or more error correction codes associated with the qubit connection geometries, instructions associated with a quantum computing application;

configuring, by the quantum bios chip, one or more switching elements of the integrated optics control system coupled to the quantum bios chip, the switching elements controlling entanglement of one or more qubits of a quantum computer and the switching elements configured based upon a selected one of the one or more qubit connection geometries and one of the one or more error correction codes that is compatible with the selected one of the one or more qubit connection geometries.

\* \* \* \* \*